Sept. 13, 1966 J. J. FLAHERTY ETAL 3,273,056
EDDY CURRENT TESTING SYSTEM IN WHICH THE POWER APPLYING CIRCUIT
HAS A LOW OUTPUT IMPEDANCE RELATIVE TO THE EFFECTIVE
INPUT IMPEDANCE OF THE TEST COIL UNIT
Filed March 22, 1963
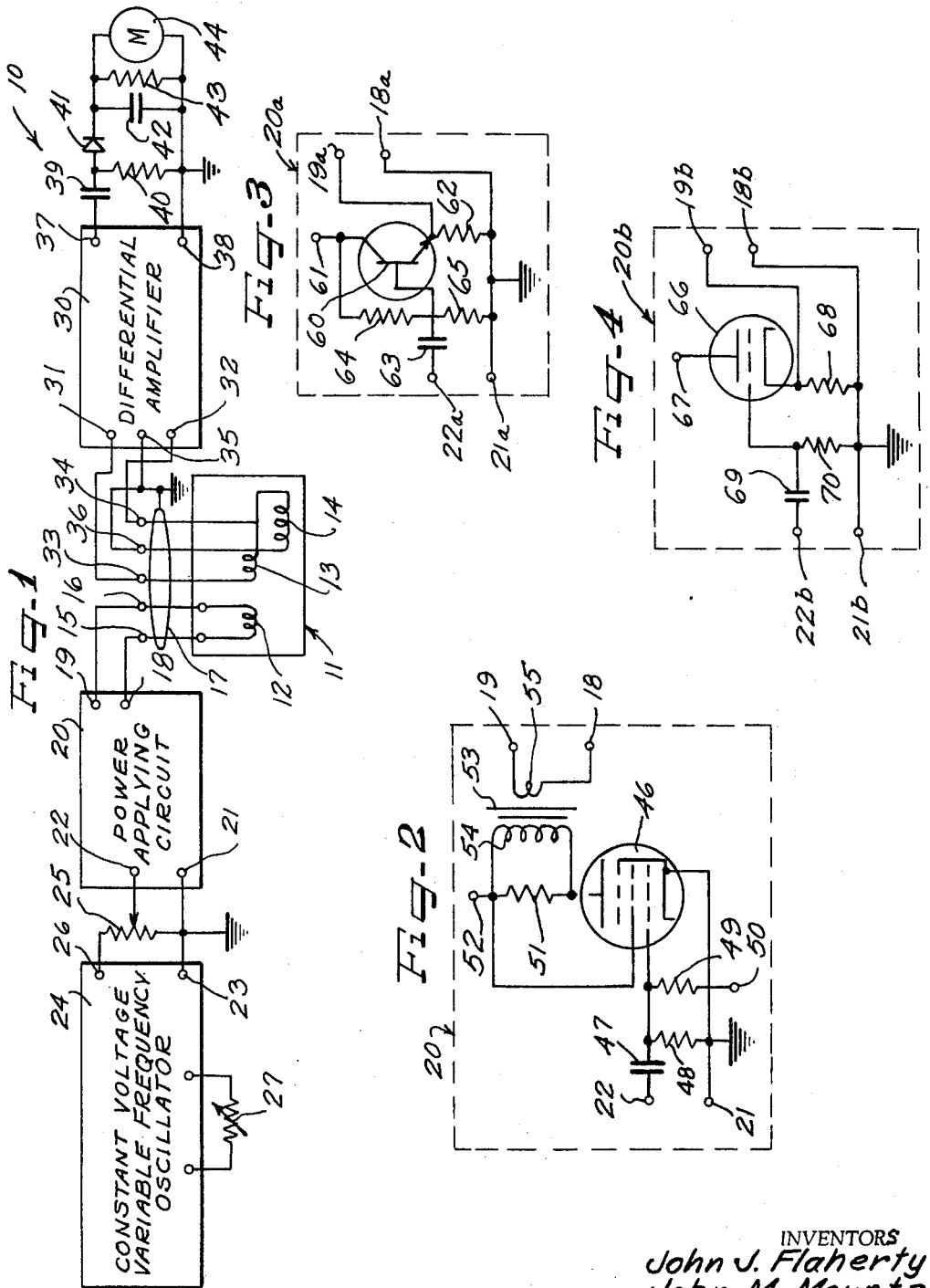
INVENTORS
John J. Flaherty
BY John M. Mountz
ATTORNEYS United States Patent Office 3,273,056
Patented Sept. 13, 1966

3,273,056
EDDY CURRENT TESTING SYSTEM IN WHICH THE POWER APPLYING CIRCUIT HAS A LOW OUTPUT IMPEDANCE RELATIVE TO THE EFFECTIVE INPUT IMPEDANCE OF THE TEST COIL UNIT
John J. Flaherty, Elk Grove Village, and John M. Mountz, Niles, Ill., assignors, by mesne assignments, to Magnaflux Corporation, Chicago, Ill., a corporation of Delaware
Filed Mar. 22, 1963, Ser. No. 267,201
7 Claims. (Cl. 324—40)

This invention relates to an eddy current testing instrument and more particularly to an instrument which is highly sensitive, accurate and reliable over a wide range of frequencies while requiring a minimum number of controls to obtain uniform operation.

Eddy current testing systems are well known in which an alternating current-excited coil is placed adjacent the surface of a test piece to induce a varying magnetic field and eddy currents therein, and in which the characteristics of the test piece and the existence of inhomogeneities are determined by measuring voltages induced from the varying field and eddy currents, either in the alternating current-excited coil or in one or more coils separate from the alternating current-excited coil.

In such systems, it is desirable to adjust the frequency of the alternating current excitation over a wide range of frequencies because in the case of some types of materials or certain types of inhomogeneities, the optimum response is obtained at low frequencies, while in other cases the optimum response is obtained at high frequencies and in still other cases the optimum response may be obtained at an intermediate frequency.

It has been found, however, that varying the frequency over a wide range can produce wide variations in the signals produced from inhomogeneities and also wide variations in amplification levels, making reliable measurements difficult and also necessitating continual adjustment of circuit values.

According to this invention, a circuit is provided for applying power to a test coil unit in a manner such as to provide automatic compensation for changes produced by changes in frequency, to provide substantially uniform response to inhomogeneities or changes in physical characteristics being measured, and to provide substantially uniform amplification levels.

The power supplying circuit of this invention is arranged to supply a substantially constant voltage to the test coil unit with a very low effective internal impedance in relation to the effective impedance of the test coil unit. With this arrangement, it is found that the current applied to the test coil unit is automatically decreased as the frequency is increased, the impedance of the test coil unit being proportional to the sum of a D.C. resistance value, an A.C. resistance value which results from eddy currents in the test piece and which increases with an increase in frequency, and an inductive reactance which also increases with frequency. The eddy current power loss, however, is maintained substantially constant since the A.C. resistance value resulting from eddy currents in the material being tested increases with frequency.

In addition, the circuit produces substantially constant voltage amplification levels. This is due to the fact that mutual inductances between primary and secondary windings are not a function of frequency and, neglecting distributed capacitances and leakage inductances, the voltages induced in the secondary windings are proportional to the input voltage.

The production of a constant amplification level is particularly advantageous when combined with a differential coil and differential amplifier circuit operated in a condition of unbalance such that the amplifier is always operated at a substantial signal voltage level, which may be accomplished by using more turns on one of the secondary windings than on the other. With such unbalanced operation, no phase and amplitude balancing is required and when the voltage level is substantially constant, as is the case with the power applying circuit of this invention, the amplifier can be operated at high gain to obtain highly sensitive operation without danger of overloading.

Specific features of the invention reside in the construction of the power applying circuit. In one preferred embodiment, a transformer is used having a large step-down turns ratio, the transformer primary being preferably connected in the plate circuit of a pentode amplifier tube. In another preferred embodiment, a transistor is used, operated as an emitter-follower while in still another embodiment, a tube is operated as a cathode-follower, a very low effective internal impedance being obtained with such arrangements.

This invention contemplates other and more specific objects, features and advantages which will become more fully apparent from the following detailed description taken in conjunction with the accompanying drawings which illustrate preferred embodiments and in which:

FIGURE 1 is a circuit diagram of an eddy current testing instrument constructed according to the principles of this invention;

FIGURE 2 is a circuit diagram of a power applying circuit of the instrument of FIGURE 1;

FIGURE 3 is a circuit diagram of a modified power applying circuit for the instrument of FIGURE 1; and FIGURE 4 is a circuit diagram of another modified power applying circuit for the instrument of FIGURE 1.

Reference numeral 10 generally designates an eddy current test instrument constructed according to the principles of this invention. The instrument may be used to detect flaws in a test piece, or to measure changes in physical characteristics of a test piece.

A test coil unit or probe 11 is disposed adjacent the surface of a test piece, the unit 11 having a primay coil 12 and a pair of differentially connected secondary coils 13 and 14 inductively coupled to the primary coil 12. In some cases, the coils 12–14 may be disposed in surrounding relation to a test piece, such as a test piece of cylindrical or tubular form. With an A.C. voltage applied to the primary coil 12, eddy currents are induced in the test piece and the differential voltage produced in the secondary windings 13 and 14 is affected by the physical character of the test piece, so that changes in the physical character or flaws can be detected.

To apply an A.C. voltage to the primary coil 12, it is connected through conductors 15 and 16 of a connecting cable 17 to output terminals 18 and 19 of a power applying circuit 20 constructed in accordance with this invention. The power applying circuit 20 has a pair of input terminals 21 and 22, input terminal 21 being connected to ground and to an output terminal 23 of a constant voltage variable frequency oscillator 24, while input terminal 22 is connected to the movable contact of a potentiometer 25 connected between ground and the second output terminal 26 of the oscillator 24.

The oscillator 24 is preferably a Wien bridge oscillator with internal negative feedback to maintain the output voltage constant over the frequency range of operation, which may preferably be from 500 to 50,000 cycles, for example. The frequency is adjustable by means of a variable resistor 27 connected to the oscillator 24. The adjustment of frequency is very important in that certain types of flaws in a test piece or changes in physical characteristics may be detected or measured more readily at low frequencies, others at high frequencies and still others at an intermediate frequency.

To respond to the voltages developed by the coil unit 11, a differential amplifier 30 is provided having input terminals 31 and 32 connected to end terminals of the coils 13 and 14 through conductors 33 and 34 and having a grounded terminal 35 connected to the other terminals of the coils 13 and 14 through a conductor 36. A pair of output terminals 37 and 38 of an amplifier 30 are connected to a detector circuit including a coupling capacitor 39 and a resistor 40 connected in series between the terminals 37 and 38, and a circuit connected in parallel with the resistor 40 including a diode 41 and the parallel combination of a capacitor 42, a resistor 43 and a meter 44. Output terminal 38 may be grounded as illustrated.

To obtain stable and yet sensitive operation, the coil unit 11 is preferably operated in a condition of unbalance such as to always operate the amplifier 30 at a substantial signal voltage level, which may be accomplished by using more turns on the secondary coil 14 than on the secondary coil 13, as diagrammatically illustrated. With this mode of operation, no phase and amplitude balancing controls are required but at the same time, a change in the relative voltages induced in the secondary coils 13 and 14, such as caused by a flaw in a part being tested, is indicated with a high degree of sensitivity by a change in the output voltage applied to the meter 44.

A very important feature of the invention is in the power applying circuit 20. As shown in FIGURE 2, the circuit 20 comprises a pentode 46 having a cathode and a suppressor grid connected to ground and to the input terminal 21, a control grid connected through a capacitor 47 to the input terminal 22, through a resistor 48 to ground and through a resistor 49 to a negative bias supply terminal 50, and a plate connected through a resistor 51 to a positive power supply terminal 52. A voltage step-down transformer 53 is provided having a primary 54 connected in parallel with the resistor 51 and a secondary 55 connected to the output terminals 18 and 19. The turns ratio of the step-down transformer 53 is high to obtain an effective internal output impedance which is very low in relation to the effective impedance presented by the coil unit 11. By way of example, each of the coils 12–14 of the unit 11 may have an inductance on the order of 100 microhenries and in operation, the impedance presented by the coil unit may vary from a value on the order of 0.1 ohm at 500 cycles to a value on the order of 10 ohms at 50,000 cycles, the step-down transformer 53 may have a turns ratio on the order of 100, with the resistor 51 having a value of 15,000 ohms and with the tube 46 being a type 6005.

By so obtaining a low source impedance, a substantially constant voltage is applied to the coil unit 11 over the operating range of frequencies and the level of the output voltage applied to the differential amplifier 30 is substantially constant. As a result, the amplifier 30 may be operated at a point at which the instrument is highly sensitive to defects, but without danger of overloading the amplifier as the frequency is adjusted over the operating range. In addition, a uniform sensitivity to inhomogeneities or changes in physical characteristics is obtained over the operating range of frequencies which, of course, is highly important.

FIGURE 3 illustrates a modified power applying circuit 20a which may be substituted for the circuit 20. The circuit 20a comprises a transistor 60 having a collector connected to a positive power supply terminal 61, an emitter connected to an output terminal 19a and through a resistor 62 to ground, and a base connected through a capacitor 63 to an input terminal 22a, through a resistor 64 to the positive terminal 61 and through a resistor 65 to an input terminal 21a, input terminal 21a and also an output terminal 18a being grounded. The emitter, collector and base of the transistor 60 may be respectively considered as constituting first, second and third electrodes wherein the effective impedance between the first and second electrodes, i.e. between the collector and emitter, is controlled by the amplitude of a signal applied between the third and first electrodes, i.e. between the base and emitter. It will be further understood that the terminal 61 and ground may be respectively connected to positive and negative terminals of a conventional D.C. current supply. With this circuit, an emitter-follower action is obtained and it is possible to obtain very low effective internal impedance and to apply a substantially constant voltage to the coil unit 11. If desired, a plurality of transistors can be connected in parallel to further reduce the internal impedance.

FIGURE 4 illustrates another modified power applying circuit 20b which may be substituted for the circuit 20. The circuit 20b comprises a triode 66 having a plate connected to a positive power supply terminal 67, a cathode connected to an output termial 19b and through a resistor 68 to ground, and a grid connected through a coupling capacitor 69 to an input terminal 22b and through a resistor 70 to ground, an input terminal 21b and an output terminal 18b being connected to ground. In this circuit, the cathode, plate and grid of the triode 66 may be considered as constituting first, second and third electrodes, wherein the impedance between the first and sceond electrodes is controllable by the amplitude of a signal applied between the third and first electrodes. With this circuit, a cathode-follower action is obtained and it is possible to obtain a low effective internal impedance and to apply a substantially constant voltage to the detector coil unit over a wide range of frequencies. If desired, a plurality of tubes can be connected in parallel to further reduce the internal impedance.

It will be understood that modifications and variations may be effected without departing from the spirit and scope of the novel concepts of this invention.

We claim as our invention:

1. In an eddy current testing system for determining the characteristics of a test piece, a test coil unit including a primary winding and a pair of differentially connected secondary windings, signal measuring means connected to said differentially connected secondary windings, a variable frequency oscillator operable over a certain frequency range, and a power applying circuit connected to said oscillator and to said primary winding of said test coil unit, said power applying circuit having a substantially constant voltage output over said frequency range and having a low effective output impedance relative to the effective input impedance of said test coil unit.

2. In an eddy current testing system for determining the characteristics of a test piece, a test coil unit having an input and an output, signal measuring means including an amplifier connected to said output, said test coil unit being operated in a condition of unbalance such that said amplifier is always operated at a substantial signal voltage level, a variable frequency oscillator operable over a certain frequency range, and a power applying circuit connected to said oscillator and to said input of said test coil unit, said power applying circuit having a substantially constant voltage output over said frequency range and having a low effective output impedance relative to the effective input impedance of said test coil unit.

3. In an eddy current testing system for determining the characteristics of a test piece, a test coil unit including a primary winding and a pair of differentially connected secondary windings, signal measuring means including a differential amplifier connected to said secondary windings, one of said secondary windings having more turns than the other to produce a condition of unbalance such that said differential amplifier is always operated at a substantial signal voltage level, a variable frequency oscillator operable over a certain frequency range, and a power applying circuit connected to said oscillator and to said primary winding of said test coil unit, said power applying circuit having a substantially constant voltage output over said frequency range and having a low effective output impedance relative to the effective input impedance of said test coil unit.

4. In an eddy current testing system for determining the characteristics of a test piece, a test coil unit having an input and an output, signal measuring means connected to said output, a variable frequency oscillator operable over a certain frequency range, and a power applying circuit having a substantially constant voltage output over said frequency range and comprising an amplifying device connected to said oscillator and a step-down transformer connected to said amplifying device and said test coil input and having a large turns ratio to provide a low effective output impedance relative to the effective input impedance of said test coil unit.

5. In an eddy current system for determining the characteristics of a test piece, a test coil unit having a pair of input terminals and a pair of output terminals, signal measuring means connected to said output terminals, a variable frequency oscillator operable over a certain frequency range, and a power applying circuit including an amplifier device having first, second and third electrodes wherein the effective impedance between said first and second electrodes is controllable by the amplitude of a signal applied between said third electrode and said first electrode, means connecting said first electrode to one of said input terminals of said test coil unit, means connecting said second electrode and the other input terminal of said test coil unit to opposite terminals of a D.C. current supply, and means connecting said third electrode and said other input terminal of said test coil unit to said oscillator, said power applying circuit having a substantially constant voltage output over said frequency range and having a low effective output impedance relative to the effective input impedance of said test coil unit.

6. In an eddy current testing system as defined in claim 5, said amplifier device being a transistor having an emitter constituting said first electrode, a collector constituting said second electrode, and a base constituting said third electrode.

7. In an eddy current testing system as defined in claim 5, said amplifier device being a vacuum tube having a cathode constituting said first electrode, an anode constituting said second electrode, and a grid constituting said third electrode.

References Cited by the Examiner
UNITED STATES PATENTS

| | | | |
|---|---|---|---|
| 3,135,914 | 6/1964 | Callan et al. | 324—40 |
| 3,159,784 | 12/1964 | Haslett et al. | 324—40 |

FOREIGN PATENTS 836,723   6/1960   Great Britain.

WALTER L. CARLSON, *Primary Examiner.*

RICHARD B. WILKINSON, *Examiner.*

R. J. CORCORAN, *Assistant Examiner.*